Oct. 30, 1945.  D. F. BAILEY  2,387,732
VEHICLE SPRING SUSPENSION
Filed April 15, 1943
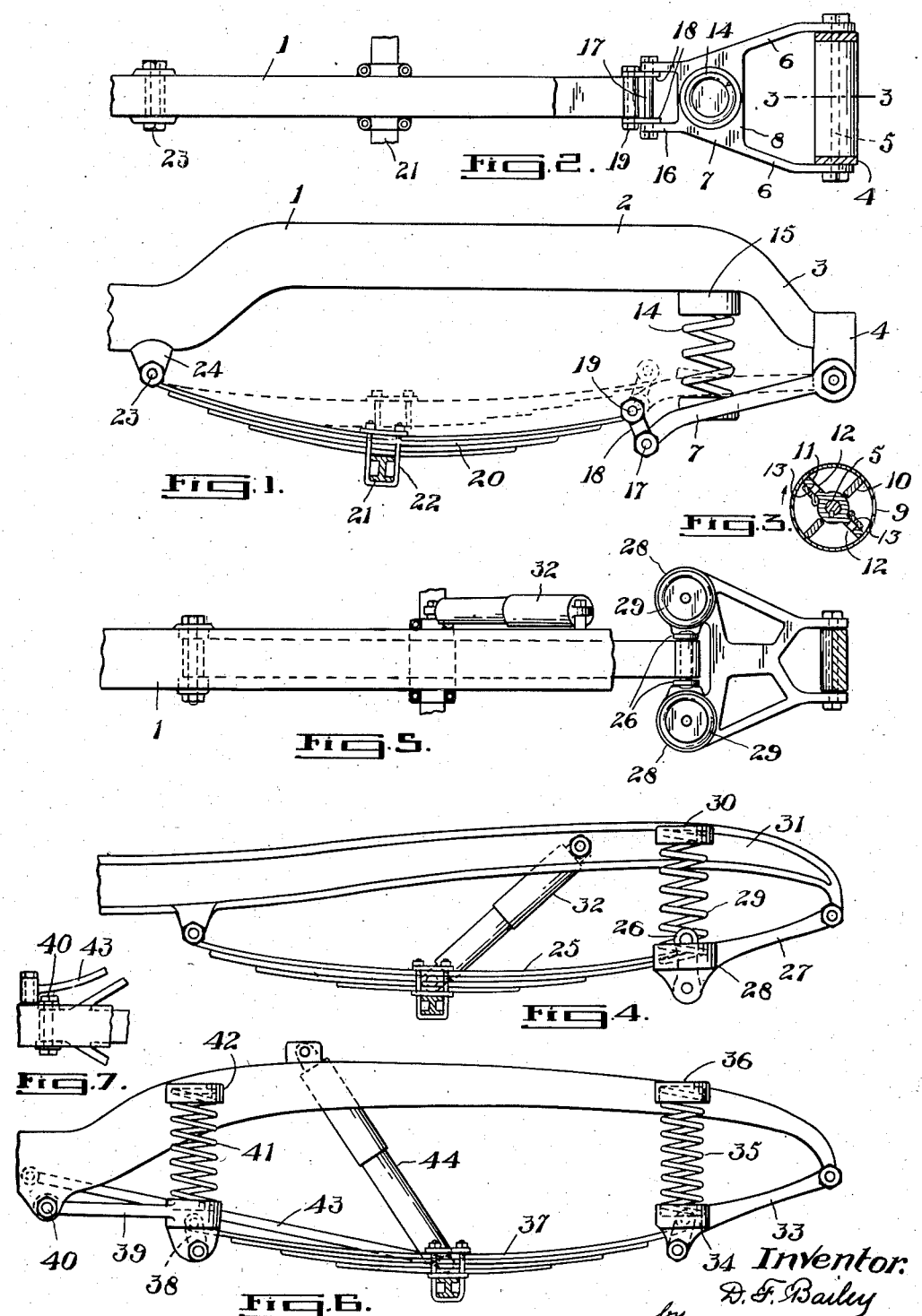
Inventor:
D. F. Bailey
by H. S. Dennison
Atty.

Patented Oct. 30, 1945

2,387,732

UNITED STATES PATENT OFFICE 2,387,732

VEHICLE SPRING SUSPENSION

Delbert F. Bailey, Toronto, Ontario, Canada

Application April 15, 1943, Serial No. 483,223

1 Claim. (Cl. 267—17)

This invention relates to improvements in spring suspension particularly adapted to automotive vehicles and the principal object of the invention is to provide a suspension which will yield readily to minor road shocks without transmitting same to the frame of the vehicle but which will effectively withstand a more rigorous or heavy shock to relieve the transmission of same to the frame, thereby presenting a spring suspension capable of smoothing out to a marked degree the irregularities of road surface that may be encountered.

A further and important object is to provide a spring suspension having extensive lateral stability which will relieve the main spring of torsional stress.

The principal feature of the invention consists in the novel arrangement of an arm pivotally connected to the frame of the vehicle and extending toward and pivotally connected with one end of a flat or semi-elliptic spring upon which the axle is mounted, through a shackle connection which permits free elongation of the semi-elliptic spring and swinging movement of the pivotal arm, said pivotal arm being resiliently restricted in its swinging movement by compression spring means interposed between said arm and the frame.

In the accompanying drawing

Figure 1 is a side elevational view illustrating one form of application of the present invention.

Figure 2 is a plan view of the structure illustrated in Figure 1 with the forward end of the frame broken away.

Figure 3 is an enlarged cross sectional view through the line 3—3 of Figure 2.

Figure 4 is a side elevational view of a modified form of application of the present invention.

Figure 5 is a plan view of the form of the invention illustrated in Figure 4 with the forward end of the frame broken away.

Figure 6 is a side elevational view of a further modified form of the invention.

Figure 7 is a fragmentary plan view of the rear end of the spring connection illustrated in Figure 6.

In the form of the invention illustrated in Figures 1, 2 and 3, the vehicle frame 1 is preferably provided with an arched or raised forward portion 2 provided with a downwardly extending forward end 3, the extremity of which is provided with a wide downturned fork extension 4.

A bolt or shaft 5 extends through the ends of the fork 4 and rigidly secured to the outer ends of said shaft are the widely spaced-apart fork ends 6 of an arm 7 which is provided with a transverse platform portion 8.

Surrounding the central portion of the shaft 5 is a closed cylinder 9 which is rigidly secured between the ends of the frame fork 4. Within the cylinder are arranged a pair of radial walls 10 projecting inwardly which are rigid with the cylinder.

Rigidly secured to the rotatable shaft 5 is a transverse vane 11 which is provided with openings 12 to permit the passage of oil therethrough and valves 13 are pivotally mounted to close the openings 12, said valves having smaller openings therethrough. The central vane 11 mounted on the shaft 5 when swung within the cylinder will move comparatively freely in one direction, the oil passing through the large holes 12 and lifting the valves, but when moved in the opposite direction the valves close automatically and the oil is subject to greater resistance in passing through the small holes in the valves.

The principle of this device is that of the ordinary oil door-check but it is made to operate in two directions, and being connected to the arm 7 it is operated through the movement of the arm.

A coil spring 14 is arranged between the platform 8 of the arm 7 and a suitable pocket 15 which is secured to the frame 2. The arm 7 is provided with a forked end 16 and a shackle bolt 17 extends thereacross, upon which is mounted the shackle bars 18. The other ends of the shackle bars are connected to a shackle bolt 19 secured in the end of the semi-elliptic or flat spring 20.

The spring 20 is mounted upon the vehicle axle 21, here shown secured thereto by a clevis 22, and the other end of the spring 20 is secured by a pivot bolt 23 between a pair of lug projections 24 forming part of the frame 1.

In the assembled structure thus described the weight of the vehicle is supported by the axle through the spring 20 and part of this support is transferred through the shackle bars 18 and arm 7 to the spring 14.

When the vehicle in operation is travelling over a road the inequalities of the road cause the upward movement of the spring toward a position illustrated in dotted lines, and in moving upward the end connected to the shackle 18 moves upwardly and, straightening out of the curve of the spring, causes endwise displacement. This is accommodated by the pivotal movement of the shackle bars on the fork end of the arm 7, and the arm 7 swings upwardly on its pivot on the shaft 5.

Minor vibrations are absorbed by the spring 14 conjointly with the spring 20, and it will be understood that major vibrations will be absorbed in the heavier spring following the partial compression of the spring 14, so that graduated resistance to shocks will occur, with the result that the frame of the vehicle will be protected against sudden and abnormal shocks.

The oil check surrounding the shaft 5 will assist materially in controlling the movement of the shaft and of the arm 17 from free movement in one direction.

The principle involved in the structure illustrated and described is carried out in the structure illustrated in Figures 4 and 5. The main or semi-elliptic spring 25 is pivotally connected through shackles 26 to an arm 27 which is similar to the arm 7 of Figures 1 and 2 but which is shaped to spread laterally at its end adjacent to the spring 25 and is provided with a pair of spring sockets 28 arranged either side of the shackles.

Coil springs 29 are mounted in these sockets and engage socket members 30 extending either side of the frame 31.

In addition to the resistance to shocks created by the paired coil springs 29 a suitable form of piston air cushion is illustrated in the telescopic member 32 connected between the frame and the clevis connection securing the axle to the spring 25, or may be a regular hydraulic device.

In the form of the invention illustrated in Figures 6 and 7 the forward swinging arm 33 is similar to the arm 27 shown in Figure 4 and is provided with paired coil spring sockets 34, in which the springs 35 are mounted and which engage sockets 36 on the frame. The spring 37, which is of the semi-elliptic multiple leaf type and which is secured to the axle, is supported at its other end from shackles 38, illustrated in dotted lines, which are connected to an arm 39 which is pivotally mounted on a bolt 40 mounted between pivot lugs on the frame.

The arm 39 is of substantially V-shape formation and supports paired springs 41 engaging spring sockets 42 on the frame.

A radius rod 43, pivotally connected above the axle to the spring 37, extends rearwardly and is pivotally connected to the frame at a point adjacent to the bolt 40, and in addition, a telescopic cushioning member 44 is arranged between the frame and the axle.

It will be understood that spring suspensions for vehicles constructed in the manner herein described will be very flexible, and, having the broad transverse bearings described, they will relieve the main spring from undue torque, and a very desirable and efficient suspension is presented which will ensure not only a very smooth ride in the vehicle but will present a structure which will ensure long and effective service.

It is an important feature of this invention that with the structure shown and described a solid axle is used but the flexibility of the leaf spring and shackle-connected spring-supported pivot arm permits a freedom of action at either end of the axle which will be the equivalent of a knee action structure without the delicate nature of such structures.

All shocks are transmitted rearwardly of the pivot arm through the shackle connection, pivot arm and coil springs to absorb said shocks.

Further, it will be seen that in following road curves all hinge connections are correctly aligned to transmit said shocks.

What I claim as my invention is:

A vehicle spring suspension comprising, the combination with the vehicle frame, of an arm having a jaw end pivotally connected to the forward end of said frame and flaring rearwardly and having a pair of spring seats spaced apart transversely thereof at the extremity of the flared portion, a shackle pivotally mounted between said spaced-apart spring seats, spring seats mounted either side of said frame above the spring seats of said arm, coil compression springs arranged between the spaced-apart arm and frame seats, and a leaf spring pivotally connected to the free end of said shackle and pivotally connected at its rear end to the frame.

DELBERT F. BAILEY.